(12) United States Patent
Dicke et al.

(10) Patent No.: US 9,561,460 B2
(45) Date of Patent: Feb. 7, 2017

(54) RESCUE TERMINAL AND SYSTEM

(71) Applicants: Nikolas Dicke, Einbeck (DE); Heinrich Eberl, Immenstadt (DE); Robert Bücher, Raisting (DE)

(72) Inventors: Nikolas Dicke, Einbeck (DE); Heinrich Eberl, Immenstadt (DE); Robert Bücher, Raisting (DE)

( * ) Notice: Subject to any disclaimer, the term of this patent is extended or adjusted under 35 U.S.C. 154(b) by 89 days.

(21) Appl. No.: 14/603,077

(22) Filed: Jan. 22, 2015

(65) Prior Publication Data

US 2016/0214051 A1     Jul. 28, 2016

(51) Int. Cl.
| | |
|---|---|
| *G08B 3/10* | (2006.01) |
| *G08B 21/14* | (2006.01) |
| *H04N 7/18* | (2006.01) |
| *H04N 9/47* | (2006.01) |
| *B01D 46/42* | (2006.01) |
| *A62B 23/02* | (2006.01) |
| *B01D 46/00* | (2006.01) |
| *B01D 46/44* | (2006.01) |
| *A62B 9/00* | (2006.01) |
| *G08B 1/08* | (2006.01) |
| *G08B 17/00* | (2006.01) |

(52) U.S. Cl.
CPC ............. *B01D 46/429* (2013.01); *A62B 9/006* (2013.01); *A62B 23/025* (2013.01); *B01D 46/0086* (2013.01); *B01D 46/448* (2013.01); *G08B 1/08* (2013.01); *G08B 17/00* (2013.01)

(58) Field of Classification Search
CPC ....... G08B 29/181; G08B 19/005; G08B 3/10; G08B 21/14; G01D 9/005; G01N 33/0075
USPC ............... 55/385.1, 385.2, DIG. 34; 340/506
See application file for complete search history.

(56) References Cited

U.S. PATENT DOCUMENTS

| | | | |
|---|---|---|---|
| 4,710,756 | A | 12/1987 | Thornburg et al. |
| 5,227,776 | A | 7/1993 | Starefoss |

(Continued)

FOREIGN PATENT DOCUMENTS

| | | |
|---|---|---|
| DE | 10 2011 121 347 A1 | 3/2014 |
| FR | 2957808 A1 | 9/2011 |

OTHER PUBLICATIONS

Partial European Search Report dated Jun. 8, 2016 as received in Application No. 16152243.8.

(Continued)

*Primary Examiner* — Jacob T Minskey
*Assistant Examiner* — Minh-Chau Pham
(74) *Attorney, Agent, or Firm* — Maschoff Brennan

(57) ABSTRACT

The invention relates to a rescue terminal for providing access to an air filter in case of an emergency, including a control system configured and provided to be activated upon a detection of a case of an emergency and having: at least one signaling device configured and provided to emit a signal upon activation of the control system; and a communication unit configured and provided for at least one of receiving and transmitting information indicative for a case of an emergency. The rescue terminal further includes a receiving housing being configured and provided for receiving an air filter device. The invention further relates to an air filter device and a rescue system. The rescue terminal, the air filter device and the rescue system enable a user of the air filter device to quickly access the air filter device in case of an emergency.

22 Claims, 10 Drawing Sheets

(56) References Cited

U.S. PATENT DOCUMENTS

| | | | |
|---|---|---|---|
| 2006/0215024 A1 | 9/2006 | Coonce et al. | |
| 2009/0193578 A1* | 8/2009 | Jang | G06F 19/3418 |
| | | | 5/1 |
| 2010/0127863 A1* | 5/2010 | Kim | G08B 25/016 |
| | | | 340/540 |
| 2010/0164732 A1* | 7/2010 | Wedig | G08B 7/066 |
| | | | 340/577 |
| 2010/0268131 A1* | 10/2010 | Efthimiou | A62B 7/10 |
| | | | 601/47 |
| 2013/0012153 A1 | 1/2013 | Brosson et al. | |
| 2013/0154832 A1* | 6/2013 | Cai | H04M 3/5116 |
| | | | 340/540 |
| 2015/0237192 A1* | 8/2015 | Kim | H04M 1/72541 |
| | | | 455/404.1 |
| 2015/0302728 A1* | 10/2015 | Gettings | G08B 29/181 |
| | | | 340/506 |

OTHER PUBLICATIONS

Extended European Search Report dated Oct. 14, 2016 as received in Application No. 16152243.8.

\* cited by examiner

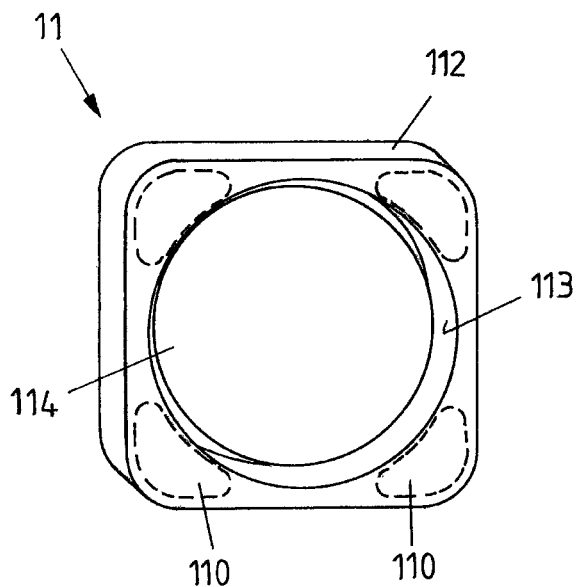
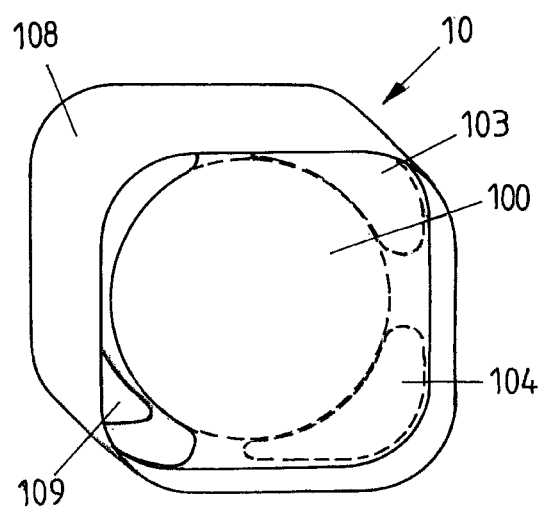

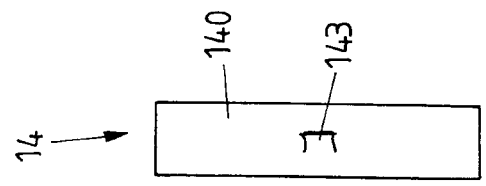
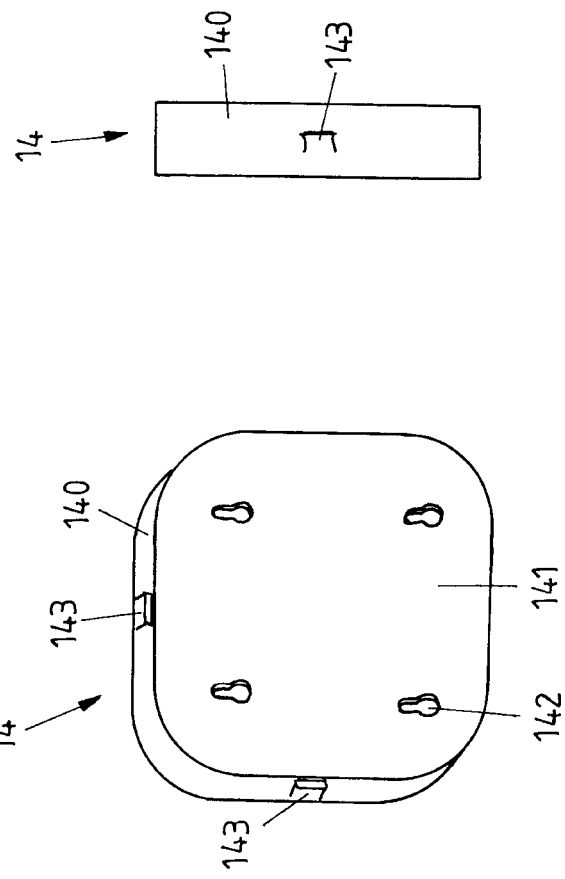
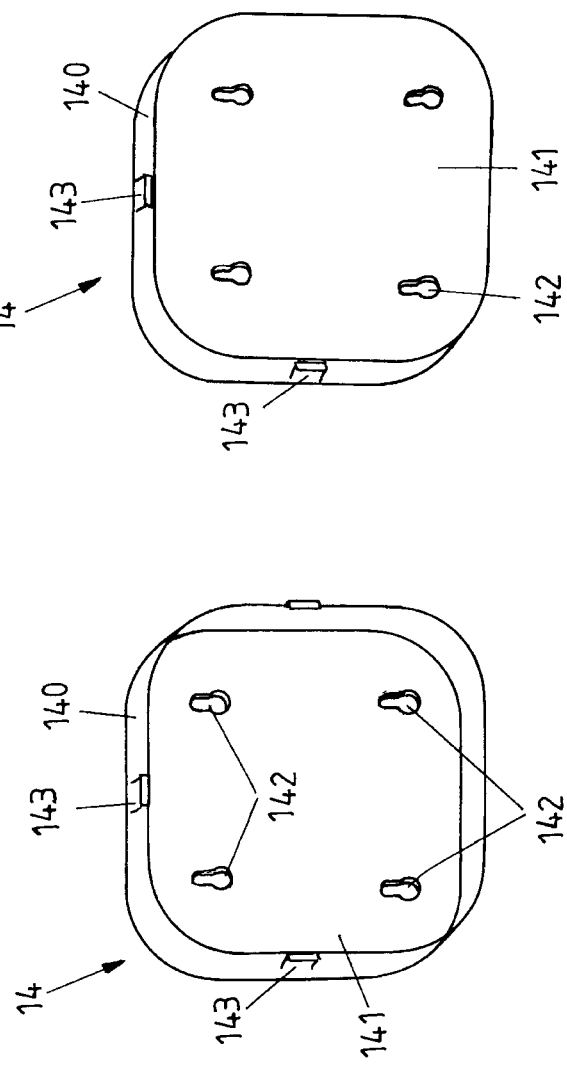

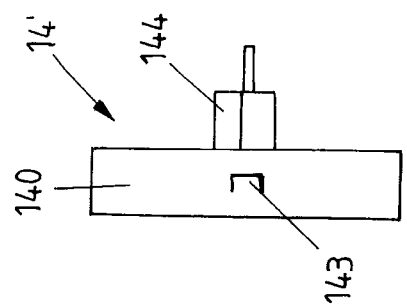
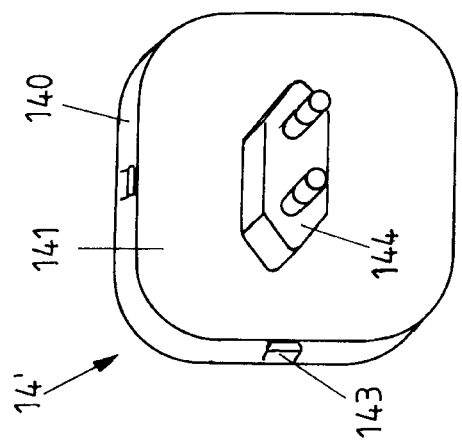
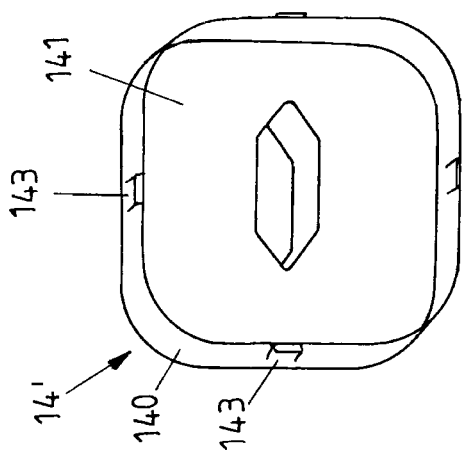

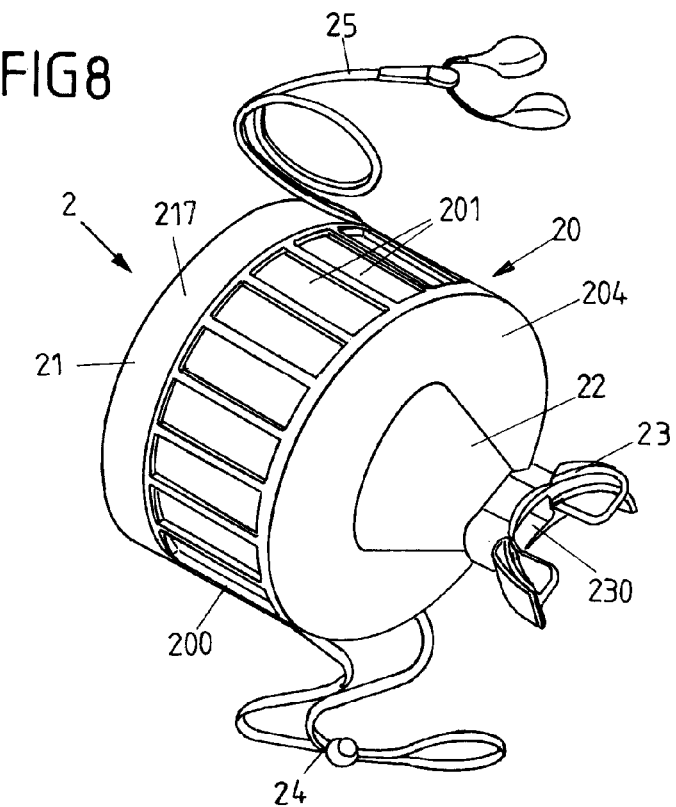
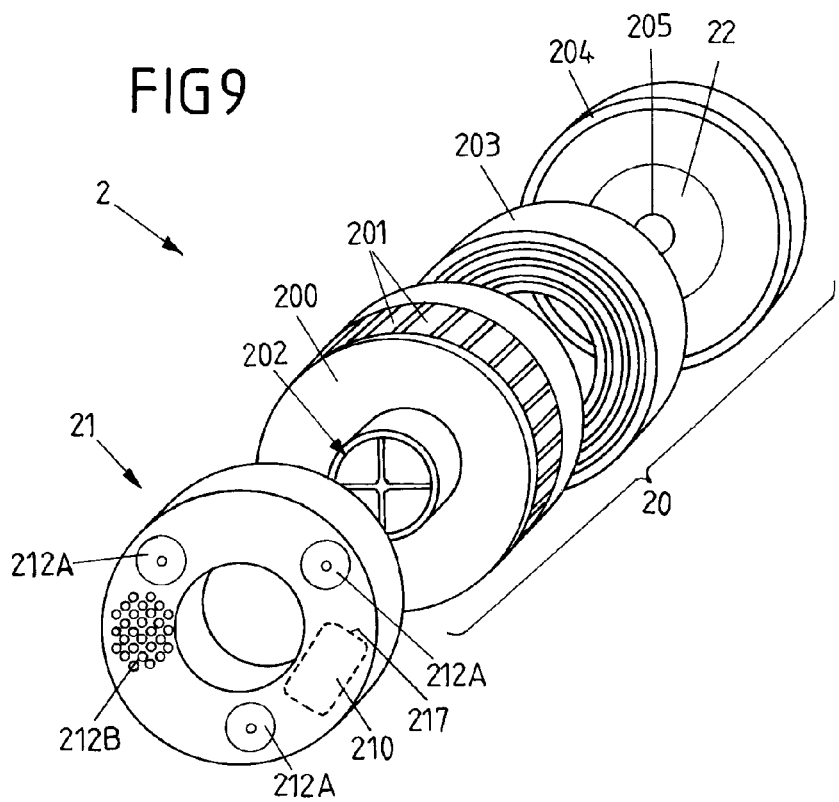

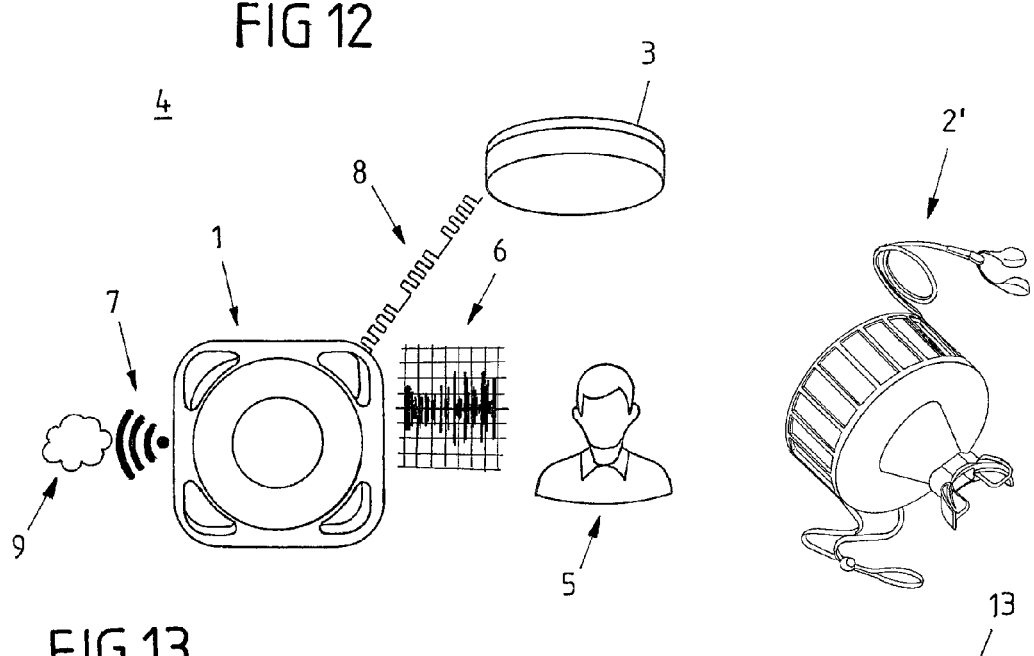
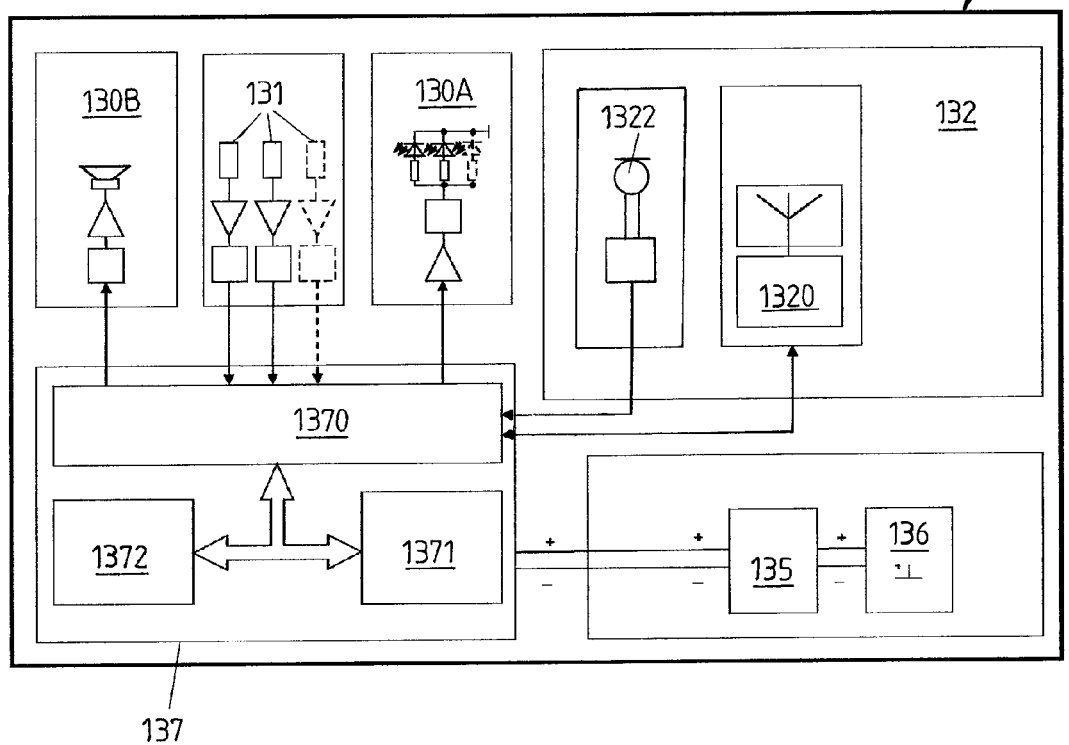

RESCUE TERMINAL AND SYSTEM

FIELD OF THE INVENTION

This invention relates to a rescue terminal for providing access to an air filter in case of an emergency, to an air filter device and to a rescue system for providing access to an air filter in case of an emergency.

BACKGROUND OF THE INVENTION

In the case of an emergency, in particular in the case of a fire, smoke may emerge being hazardous for individuals exposed to the smoke. Particularly when smoke emerges from incomplete combustion, it may contain poisonous combustion gases such as carbon monoxide which is colorless, odorless and flavorless and thus cannot be sensed by humans. Inhaling substantial concentrations of carbon monoxide is dangerous to life. It is known to install smoke detectors in order to warn against the presence of smoke or particularly in the presence of carbon monoxide, so that individuals can leave the site or building where the smoke emerges. Particularly when the smoke emerges from a fire within a building, the concentration of poisonous gases such as carbon monoxide regularly increases with the progress of time from the start of the fire onwards. It is, therefore, important to prevent the inhalation of the poisonous gases as early as possible in order to increase the probability of survival of the individuals exposed to the smoke.

It is known to provide portable air filters for covering the mouth and/or nose of a user for at least temporarily filtering the air inhaled by the user, i.e., filtering poisonous components present in the air. By the use of the air filter, the user may survive a longer time span while being exposed to the smoke, which longer time span may allow the user to find an exit of the building and escape the fire and smoke.

DE 10 2011 121 347 A1 describes an air filter device having a speech output system, which air filter device can be used by an individual for filtering air to be inhaled and protect the individual from poisonous gases, wherein the speech output system provides the user with information regarding the proper use of the air filter device and the shortest path for leaving the building in which he is exposed to the smoke.

However, in the case of an emergency, particularly in the case of a fire with emerging smoke, it may be difficult for an individual to find and access the air filter. For example, the user may not know whether or not an air filter device is actually within reach. As another example, in the case that the user is aware of an air filter device within his reach, e.g., within the building or site he is currently located at, the user may not know or may not memorize where the air filter device is located or stored. In the case of an emergency the user may be in panic and therefore not memorize a storage place of the air filter device; also, the emergency may cause chaotic circumstances making it difficult for the user to locate the air filter. Furthermore, a purchase of an air filter device may date back a long time, e.g. several years within which no emergency occurred and there was no need for an air filter device and the user may have forgotten where the air filter device had been stored at that time.

It is the object of the invention to provide a device and a system which enable a user to quickly access an air filter device in case of an emergency.

SUMMARY OF THE INVENTION

According to an embodiment, a rescue terminal for providing access to an air filter in case of an emergency comprises a control system configured and provided to be activated upon a detection of a case of an emergency and having at least one signaling device configured and provided to emit a signal upon activation of the control system, and a communication unit configured and provided for at least one of receiving and transmitting information indicative for a case of an emergency. The rescue terminal further comprises a receiving housing being configured and provided for receiving an air filter device.

The communication unit may comprise a wireless communication interface configured and provided for communicating via at least one of the following types of communication: radio, wireless local area network, cellular network, optical and infrared.

The communication unit may comprise a wired communication interface configured and provided for communicating via a wired network.

The communication unit may comprise a microphone for receiving an acoustic signal.

Said control system may be configured for identifying an acoustic signal of an external smoke detector received by the microphone.

The control system may further comprise at least one sensor unit configured for detection of a case of an emergency by sensing a characteristic feature of a case of an emergency. According to an embodiment the characteristic feature sensed by the sensor unit is at least one of the group of: a presence of smoke, a density of smoke, a concentration of carbon monoxide, a concentration of carbon dioxide, a concentration of hydrogen cyanide and a temperature.

The signal emitted by the signaling device may be at least one of an acoustic and an optical signal. For example, the signal emitted by the signaling device may comprise an acoustic speech output containing at least one of information regarding the presence of an emergency, information regarding the rescue terminal location and directions for use of the rescue terminal.

The rescue terminal may further comprise a cover configured and provided for closing the receiving housing in an air-tight manner. The receiving housing may be opened by a rotation of the cover with respect to the main body in order to access the receiving housing and/or an air filter device arranged therein, the cover may be removed from the receiving housing. An opening of the cover by a rotational movement may provide for a particularly simple opening procedure.

In an embodiment, the rescue terminal further comprises an air filter device accommodated in the receiving housing in an air-tight manner.

The receiving housing of the rescue terminal may be adapted to be mounted on a wall, in particular on a wall of a building and/or inside a building. For this purpose, the receiving housing may comprise suitable fastening means and/or may comprise a plug to be inserted into a power socket arranged on a wall.

According to another aspect, a rescue terminal for providing access to an air filter in case of an emergency comprises a control system configured and provided to detect of a case of an emergency and having at least one sensor unit configured for detection of a case of an emergency by sensing a characteristic feature of a case of an emergency, such as at least one of the group of: a presence of smoke, a density of smoke, a concentration of carbon monoxide, a concentration of carbon dioxide, a concentration of hydrogen cyanide and a temperature. The control system further has at least one signaling device configured and provided to emit a signal upon detection of a case of an emergency. The rescue terminal further comprises a receiving housing being configured and provided for receiving an air filter device and to be mounted on a wall, in particular a wall of a building.

The control system of the rescue terminal may further comprise a communication unit configured and provided for at least one of receiving and transmitting information indicative for a case of an emergency.

According to another aspect, an air filter device is provided, configured to be accommodated in an air-tight receiving housing of any embodiment of a rescue terminal disclosed herein and having a filter unit configured for filtering air flowing through the filter unit; and a control system having an inactive state and an active state and comprising a communication unit configured and provided to be connectable with a communication network via the rescue terminal upon activation of the control system.

The air filter may further comprise a collapsible portion being extendable from a collapsed configuration into an extended configuration, and wherein the control system is configured to be activated upon extension of the collapsible portion from the collapsed configuration into the extended configuration.

According to an embodiment, the communication unit of the control system is further configured to communicate with an external smoke detector.

The control system may further comprise at least one sensor unit configured and provided for sensing at least one of the group of: a presence of smoke, a density of smoke, a concentration of carbon monoxide, a concentration of carbon dioxide, a concentration of hydrogen cyanide, a temperature and a health status (such as the pulse, a breathing frequency or the like) of a user of the air filter.

According to an embodiment, the control system further comprises a positioning system.

The control system may further comprise a signaling device configured and provided to emit a signal upon activation of the control system.

The air filter device may further comprise a mouth piece configured and provided to be inserted into a mouth of a user of the air filter device, wherein the mouth piece is connected with the filter unit via the collapsible portion. Alternatively, a mask for covering at least a mouth and a nose of a user may be provided.

According to another aspect, a rescue system for providing access to an air filter in case of an emergency comprises a smoke detector, an air filter device, and any embodiment of a rescue terminal disclosed herein. The smoke detector may comprise a communication unit and the communication unit of the control system of the rescue terminal may be configured for receiving information indicative for a case of an emergency from the communication unit of the smoke detector.

The smoke detector may comprise at least one sensor unit configured for detection of a case of an emergency by sensing a characteristic feature of a case of an emergency. Therein, the characteristic feature sensed by the sensor unit may be at least one of the group of: a presence of smoke, a density of smoke, a concentration of carbon monoxide, a concentration of carbon dioxide, a concentration of hydrogen cyanide and a temperature.

In an embodiment, the communication unit of the rescue terminal comprises a microphone for receiving an acoustic signal and the control system of the rescue terminal is configured for identifying an acoustic signal of the smoke detector received by the microphone.

The air filter device may comprise a control system comprising a communication unit configured and provided to be connectable with a communication network via at least one of the rescue terminal, a communication unit of another air filter device and the smoke detector. When the control system of the air filter device assumes the active state, the communication unit of the air filter device may be configured and provided to send a piece of information to at least one of the rescue terminal, a communication unit of another air filter device and the smoke detector. The communication unit of the rescue terminal, the communication unit of the smoke detector and the communication unit of the air filter device are connectable with each other via at least one of the following types of communication: radio, wireless local area network, cellular network, optical and infrared.

BRIEF DESCRIPTION OF THE DRAWINGS

To further clarify certain aspects of the present invention, a more particular description of the invention will be rendered by reference to specific example embodiments which are disclosed in the accompanying drawings. It is noted that these drawings depict only example embodiments and are therefore not to be considered limiting the scope of the present invention. Certain aspects will be described and explained in detail through the use of the accompanying drawings in which:

FIG. 4 is a back view of the cover of the rescue terminal according to FIGS. 1 to 3;

FIG. 5 is a back view of the main body of the rescue terminal according to FIGS. 1 to 3;

FIG. 6A to 6C show different views of an embodiment of a back panel for mounting a rescue terminal;

FIG. 7A to 7C show different views of another embodiment of a back panel for mounting a rescue terminal;

FIG. 8 shows an embodiment of an air filter device;

FIG. 9 is an exploded view showing components of the air filter device according to FIG. 8;

FIG. 12 shows an embodiment of a rescue system;

FIG. 13 shows a block diagram of a control system of a rescue terminal according to an embodiment;

DETAILED DESCRIPTION

Figure 1:
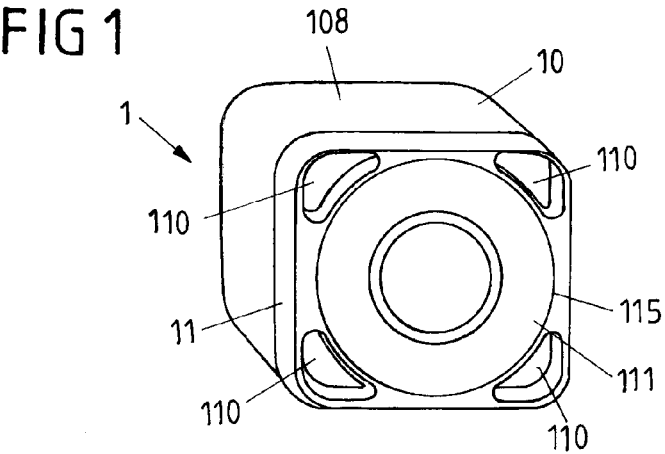
FIG. 1 illustrates an embodiment of a rescue terminal having a main body and a cover being in a closed position.

FIG. 1 illustrates an embodiment of a rescue terminal 1 for providing access to an air filter device 2 in the case of an emergency. As will be described in greater detail below, the rescue terminal 1 is configured to store the air filter device 2.

The rescue terminal 1 comprises a main body 10 and a cover 11. The rescue terminal 10 is substantially cube-shaped or of the shape of a parallelepiped and has four chamfered edges on its outer wall 108 extending between the front and rear sides of the rescue terminal 1. The cover 11 has a front face 115 on which a plurality of depressions 110 are provided, in particular four depressions 110 with one at each of four corners of the front face 115. The front face 115 is substantially quadratic with chamfered corners, each forming a portion of said four chamfered edges of the rescue terminal. The depressions 110 are configured to be operated by a user. By operating the depressions 110, the cover 11 can be rotated in order to open the cover 11 and gain access to the air filter device 2 stored in the rescue terminal. On the front face 115 of the cover 11 there is provided a label 111 indicating how to open the cover 11, e.g. by means of an arrow or written instructions.

Figure 2:
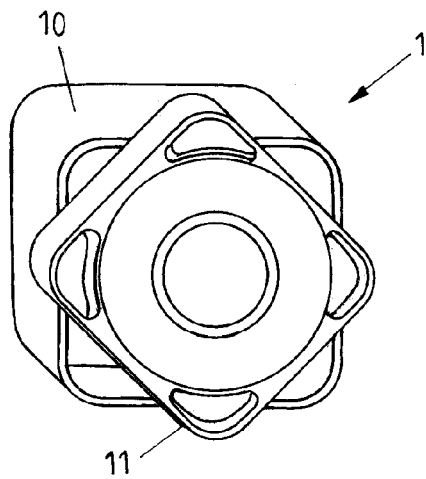
FIG. 2 illustrates the embodiment of the rescue terminal according to FIG. 1 with the cover being in an opened position.

The cover 11 of the rescue terminal 1 is configured to be opened by rotating the cover 11 counter-clockwise with respect to the main body 10. Alternatively, the cover 11 of the rescue terminal 1 could also be configured to be opened by rotating the cover 11 clockwise with respect to the main body 10. For this purpose, the user may, e.g., engage one or more of the depressions 110 with his fingers and rotate the cover into a position as shown in FIG. 2. The label 111 may therefore show an arrow pointing in counter-clockwise direction (or a clockwise direction, respectively). FIG. 2 shows the cover 11 rotated with respect to the main body 10 by about 45 degrees (the rotation of 45 degrees serves as an example while other angles are also conceivable, such as 90 degrees, 30 degrees or other angles, both either in clockwise or in counter-clockwise direction). In this position, the cover 11 is unlocked from the main body 10 and may be removed therefrom. Therefore, the rescue terminal 1 may be opened in a simple manner. The label 111 further aids the user in opening the rescue terminal 1.

A resilient element, such as a spring, may be provided to assist an opening of the cover 11.

Figure 3:
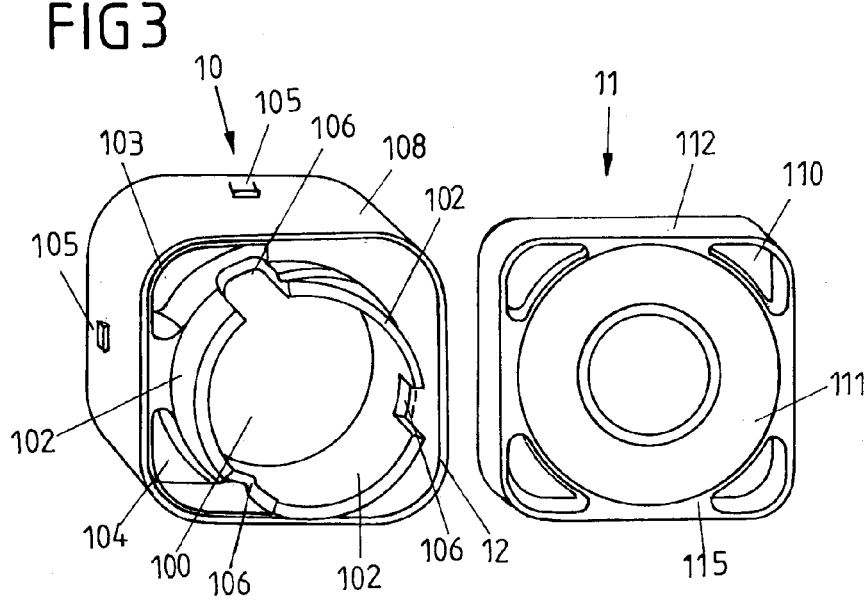
FIG. 3 illustrates the rescue terminal according to FIGS. 1 and 2 with the cover being removed from the main body.

FIG. 3 shows the rescue terminal 1 of FIGS. 1 and 2 with the cover 11 now being removed from the main body 10 so that the interior of the main body 10 is visible. As shown in FIG. 3, the main body 10 comprises a substantially circular-cylindrical receiving housing 100 configured for accommodating the air filter device 2. The housing 100 is partially formed by protruding wall portions 102. The protruding wall portions 102 protrude from the main body 10 in the direction of the front face 115 of the cover 11. The protruding wall portions 102 form sections of a circular cylinder. On their outer shell surface, the protruding wall portions 102 are provided with a screw thread which is engaged by a corresponding screw thread provided on a rear side of the cover 11 when the cover 11 is mounted on the main body 10. Several, presently three, cutouts 106 intersect the protruding wall portions 102. Adjacent to each of two of the cutouts 106, a receptacle 103, 104 is formed in the main body 10. Both receptacles 103, 104 are located at one of the chamfered edges of the main body 10. Adjacent to the outer wall 108 of the main body 10, a sealing 12 is arranged. When the cover 11 is disposed on the main body 10 in a closed position, the sealing 12 seals the main body 10 against the cover 11. Due to the sealing 12 the receiving housing 100 and the receptacles 103, 104 are closed and sealed in an air tight manner. In the closed position, a circumferential wall 112 of the cover 11 is in alignment with the outer wall 108 of the main body 10.

The main body 10 further has several bendable latching connectors 105 for a latching connection with a back plate for mounting the rescue terminal 1, e.g., on a wall of a building. The main body 10 has four latching connectors 105, one on each of the side faces formed by the outer wall 108, and adjacent to a rear face of the main body 10.

FIGS. 4 and 5 show the rear sides of the cover 11 and the main body 10, respectively. On its rear side, the cover 11 has a receptacle 114. The receptacle 114 has a substantially circular-cylindrical shape substantially corresponding to the shape of the receiving housing 100 of the main body 10. On its circumferential cylindrical inner surface 113, the receptacle 114 has a screw thread corresponding to the outer screw thread provided on the protruding wall portions 102 of the main body 10, so that the cover 11 may be screwed on or off the main body 10. In FIG. 4, the location of the depressions 110 formed in the front face 115 of the cover 11 are indicated with dashed lines.

As can be seen in FIG. 5, the main body 10 comprises a receptacle 109 at its rear side shown in FIG. 5. Rear-side receptacle 109 is accessible from the rear side of the main body 10, whereas receptacles 103, 104 are accessible from the front side of the main body 10, opposing its rear side. In FIG. 5, the location of the receptacles 103, 104 accessible from the front side of main body 10 are indicated with dashed lines. Rear-side receptacle 109 substantially extends between two adjacent chamfered edges of the main body 10. Rear-side receptacle 109 further substantially extends around a portion of the cylindrical receiving housing 100. Cylindrical receiving housing 100 is not accessible from the rear side and in FIG. 5, thus, its location is indicated with a dashed line.

The receptacles 103, 104, 109 provided at the main body 10 serve for housing components of the air filter device 2, and a control system 13 of the rescue terminal 1, respectively, as will be described in greater detail below.

FIGS. 6A to 6C show a front view (FIG. 6A), a back view (FIG. 6B) and a side view (FIG. 6C) of an embodiment of a back panel 14 for mounting the rescue terminal 1 to a wall, in particular to a wall in the interior of a building.

The back panel 14 comprises a substantially quadratic back plate 141 with four chamfered corners, and a circumferential wall 140 vertically protruding from the back plate 141. A plurality of bendable latching connectors 143 are provided on four sides of the circumferential wall 140. In the embodiment shown in FIG. 6A to 6C, four latching connectors 143 are provided on the circumferential wall 140 of the back panel 14.

For mounting (in particular on a wall inside a building) at least one, preferably four, mounting openings 142 are provided in the back plate 141. Each mounting opening 142 comprises a circular section for inserting a portion of a fastening element such as a nail, pin or screw head, and an elongate section extending from the circular opening with a smaller diameter and configured to retain the back panel 14 on the fastening element.

In order to connect the back panel 14 with the main body 10 of the rescue terminal 1, the back panel 14 is plugged on the back side of the main body 10. The latching connectors 143 of the back panel 14 and the latching connectors 105 of the main body 10 are arranged so as to engage with each other and form a latching connection, retaining the back panel 14 on the main body 10.

FIGS. 7A to 7C show a front view (FIG. 7A), a back view (FIG. 7B) and a side view (FIG. 7C) of another embodiment of a back panel 14' for mounting the rescue terminal 1 (in particular to a wall in the interior of a building). Back panel 14' according to FIGS. 7A to 7C differs from back panel 14 according to FIGS. 6A to 6C in that instead of mounting openings 142, back panel 14' comprises an electrical plug 144. The electrical plug 144 projects from the back side of the back plate 141 and comprises at least two electrical connectors. Electrical plug 144 may be formed so as fit into mating electrical sockets. Particularly, electrical plug 144 may be formed so as to fit into electrical sockets in accordance with given standards of a country wherein the rescue terminal 1 is to be used. The electrical plug 144 may provide power to a control system 13, 13', 13" of the rescue terminal described in greater detail below.

It will be appreciated that mounting the rescue terminal 1 on a wall by means of the electrical plug 144 provides for a particularly simple mounting procedure. It is to be noted that the electrical plug 144 may only serve for mounting the rescue terminal 1 and at the same time may not serve for receiving electrical power from the electrical socket.

By mounting the rescue terminal 1 on a wall it may become particularly easy to be found by a user.

The latching connection of the two different back panels 14, 14' shown in FIGS. 6A to 7C with the main body 10 may be releasable, so that back panels 14, 14' are exchangeable.

Figure 10:
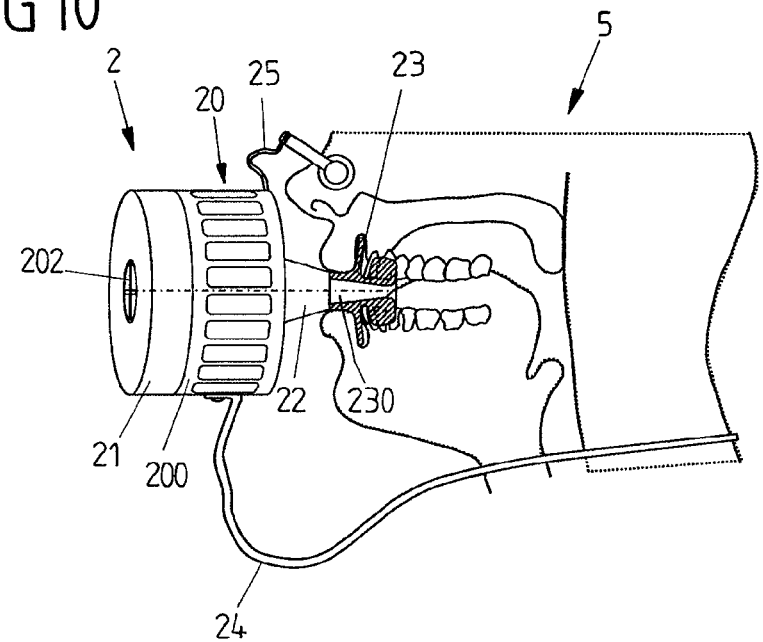
FIG. 10 shows the air filter device according to FIG. 8 being applied by a user.

FIG. 8 shows an embodiment of an air filter device 2. FIG. 9 is an exploded view showing several components of the air filter device 2 of FIG. 8. FIG. 10 shows the air filter device 2 being in use by a user 5.

The air filter device 2 comprises a filter unit 20 which serves to filter air being guided through a filter 203. The filter is arranged in a filter housing 200 of the filter unit 20. The filter 203 may be any known filter suitable to filter air, particularly to filter specific components (particularly poisonous components) out of the air guided through the filter 203. Such poisonous components may be, e.g., sulfur dioxide, hydrogen cyanide, solid particulates or others.

In order to guide air through the filter 203 for filtering the air and subsequent inhalation of the filtered air by the user 5, the filter 203 is disposed inside the filter housing 200 which has a plurality of inlet openings 201 and is in fluid connection with a mouth piece 23.

The mouth piece 23 is adapted to be inserted in the mouth of the user 5 as shown in FIG. 10. The mouth piece 23 may be formed as a mouth piece of a snorkel. For using the air filter device 2, the user just needs to insert the mouth piece in the mouth and hold it with the mouth. The air filter device 2 is therefore particularly easy to apply. The mouth of the user also serves for sealing the respiratory ducts of the user 5 against the air filter device 2. Therefore, no mask for covering the user's 5 face or parts thereof is necessary. Masks may be relatively large (in comparison to the air filter device 2) and therefore difficult to store and also more difficult to apply compared to the air filter device 2. Further, masks may not seal the respiratory ducts tightly when the user is bearded and/or may be difficult to apply when the user wears glasses. To allow the user 5 to inhale air through the filter 203, the mouth piece has a through opening 230 connected with the interior of filter housing 200 via an opening 205 in a back portion 204 thereof.

The filter housing 200 and the mouth piece 23 are connected with one another via a collapsible portion 22. Collapsible portion 22 is preferably made of an elastic material and may be transferred from a collapsed configuration into an extended configuration and vice versa. In the collapsed configuration, the collapsible portion 22 is folded inwards, in particular so as to at least partially extend within the interior of the filter housing 200. In the extended configuration, the collapsible portion 22 projects from the back portion 204 of the filter housing 200 along a length direction of the air filter device 2 as shown in FIGS. 8 and 10. The total length of the air filter device 2 is greater when the collapsible portion 22 is in its extended configuration compared to the total length of the air filter device 2 when the collapsible portion 22 is in its collapsed configuration. When being in its extended configuration, the collapsible portion 22 has a substantially conical shape.

The filter housing 200 of the filter unit 20 has a substantially circular-cylindrical shape. Its inlet openings 201 are arranged on its shell surface and may particularly extend over substantially the whole circumference of the filter housing 200 shell surface. The inlet openings 201 are provided in the form of slits.

For an unhindered exhalation of air by the user 5 the air filter device 2 comprises an outlet valve 202. The outlet valve 202 may be arranged at a side of the air filter device 2 opposing the mouth piece 23. When the user 5 inhales air, the outlet valve 202 closes so that no unfiltered air becomes inhaled by the user 5.

The air filter device 2 further comprises a control system 21. Control system 21 has a plurality of components being arranged in or at a housing 217 of the control system 21. Housing 217 has a substantially ring-shaped form with a through opening being engaged by the outlet valve 202 of the air filter device 2.

Given the overall shape of the air filter device 2, it may also be referred to as "rescue donut".

The control system 21 has a plurality of signaling devices in the form of light sources 212A, preferably light emitting diodes, and in the form of at least one loudspeaker 212B, as can be seen particularly in FIG. 9. The control system 21 further comprises a communication unit 210, among other components. The control system 21 and its components will be described in more detail with reference to FIG. 15 below.

For preventing unfiltered air to be inhaled via the user's 5 nose, the air filter device 2 is equipped with a nose clip 25. The nose clip may 25 be a separate component or may be connected with a part of the air filter device 2, e.g. an upper side (when the air filter device 2 is in use) of the filter housing 200, by means of a strap. Such a connection via a strap may prevent the loss of the nose clip 25. The air filter device 2 further comprises a neckband 24 for hanging around the neck of the user 5 in order to prevent a loss of the air filter device 2. The neckband 24 may be connectable or be connected with the air filter device 2 at a lower side (when the air filter device 2 is in use) of the filter housing 200.

Figure 11:
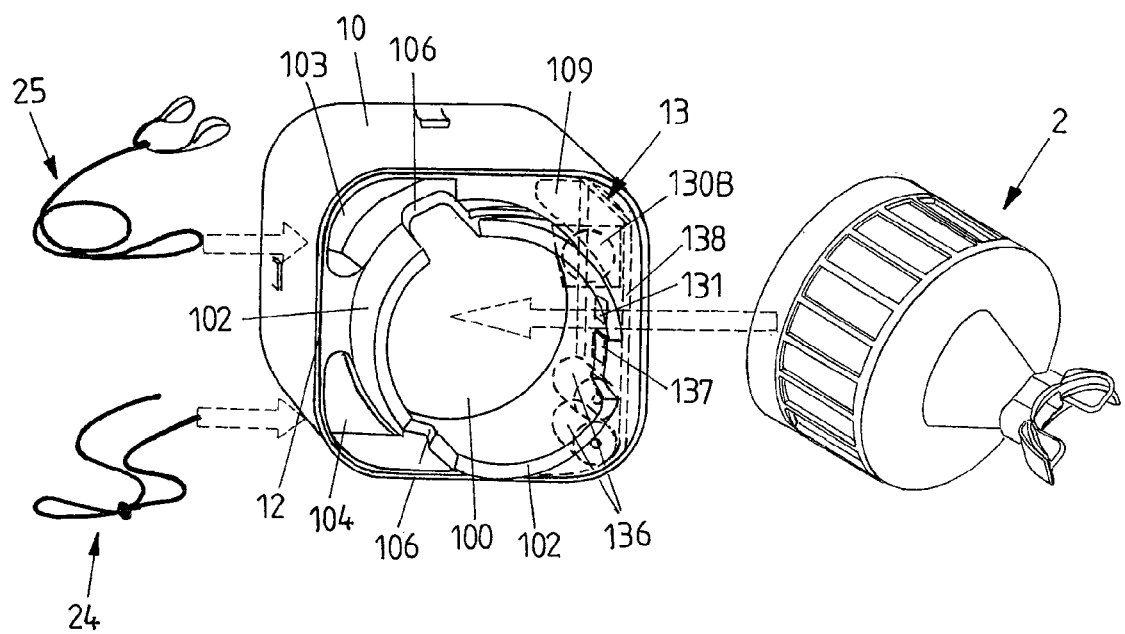
FIG. 11 shows the main body of the rescue terminal according to FIGS. 1 to 5 together with a control system and the air filter device according to FIG. 8.

FIG. 11 shows the main body 10 of the rescue terminal 1 according to FIGS. 1 to 5 equipped with a control system 13 and the air filter device 2 according to FIGS. 8 to 10.

As indicated by the arrows in FIG. 11, the air filter device 2 is to be stored in the receiving housing 100, the neckband 24 of the air filter device 2 is to be stored in receptacle 104, and the nose clip 25 of the air filter device 2 is to be stored in receptacle 103. The cutouts 106 in the protruding wall portions 102, connecting each of the receptacles 103, 104 with the receiving housing 100 allow a storage of the air filter device 2 being connected with its neckband 24 and nose clip 25, wherein the air filter device 2, the neckband 24 and the nose clip 25 each are accommodated in their corresponding receptacles 103, 104 in the rescue terminal 1.

Indicated with dashed lines FIG. 11 further shows the storage of the control system 13 in rear-side receptacle 109.

The control system 13 comprises various components, such as a loudspeaker 130B, batteries 136, a plurality of sensor units 131 and control electronics 137. The components are arranged on a base plate 138 of the control system 13, which may be, e.g., a printed circuit board. It should be appreciated that FIG. 11 shows the control system 13 only schematically and the control system 13 may comprise other components as depicted in FIG. 11. During assembly of the base plate 138 on the main body 10, the base plate 138 is slid into the read-side receptacle 109, where it is guided and retained by a guide rail not shown in the figures. Latching or snap-on connections are provided at or on the guide rail and serve for a fixture of the base plate 138 together with the components arranged on the base plate 138 within receptacle 109.

The electrical power for operating the control system 13 is provided by means of a cable connection not shown in the figures, e.g. with a power supply unit being integrated in the rescue terminal 1 or being external thereto. As an example, the cable connection could be a USB-cable connected with an external USB-socket. Alternatively, when the rescue terminal 1 is equipped with the embodiment of the back panel 14' according to FIGS. 7A to 7C, power may be provided via the electrical plug 114. Optionally, the control system 13 may be supplied with power from the electrical plug 114 via a power supply unit, e.g. transforming an electrical voltage. For the case of a failure of the power supply, e.g. due to a power blackout which may be associated with the emergency, the batteries 136 provide power to the control system 13.

When stored, air filters need to be air-tightly packed in order to maintain their functionality to filter air as intended over a certain time period. Since the air filter device 2 is stored within the rescue terminal 1 in an air tight manner by use of the sealing 12 which seals the main body 10 against the cover 11, the air filter device 2 can be stored for a longer period, e.g. for several years, while maintaining its air filtering functionality.

One or more rescue terminals may particularly be installed on a wall in a bedroom inside a building, and particularly at (an) easily accessible location(s).

Turning now to FIG. 12, an embodiment of a rescue system 4 will be described. The rescue system 4 is preferably to be installed inside a building and includes a rescue terminal 1, an air filter device 2', and a smoke detector 3. The rescue terminal 1 accommodates the air filter device 2' as described above. The air filter device 2' shown in FIG. 12 corresponds to the air filter device 2 described with particular reference to FIGS. 8 to 10; however, in contrast thereto the air filter device 2' according to FIG. 12 does not comprise any control system.

As default, the rescue terminal 1 is in a passive state in which only specific parts of the control system 13 are active. In the case of an emergency, as e.g. the case of a fire, with the generation of smoke, the smoke detector 3 will emit an acoustic signal 8 upon detection of the smoke. The acoustic signal 8 may be pulsed and may have a predefined or known frequency.

The active parts of the control system 13 of the rescue terminal 1 detect and identify the acoustic signal 8 of the smoke detector 3. Upon identification of the acoustic signal 8 emitted by the smoke detector 3, the control system 13 of the rescue terminal 1 becomes activated and starts to emit a warning signal 6 perceptible to the user 5. Upon perception of said warning signal 6, the user 5 opens the cover 11 of the rescue terminal 1 as described above and withdraws the air filter device 2' from the receiving housing 100 of the rescue terminal 1. As the air filter device 2 is stored in the rescue terminal 1 with the collapsible portion 22 in its retracted configuration, the user 5 pulls the mouth piece 23 from the filter housing 200 so as to bring the collapsible portion 22 into its extended configuration in which the air filter device 2 is ready for use for filtering air inhaled by the user 5.

The warning signal 6 is preferably emitted in the form of speech output comprising the output of spoken user instructions on how to open the rescue terminal 1 for access to the air filter device 2', how to use the air filter device 2', how to exit the building and/or other information such as information regarding the location of the rescue terminal 1 and/or an escape route. When smoke is present inside the building and/or there is darkness, orientation may be difficult for the user 5. Alternatively or in addition to the speech output, the warning signal 6 may therefore comprise a light, in particular a flashlight, for indicating the location of the rescue terminal 1 to the user 5. Of course, the flashlight may also serve to visually indicate the presence of an emergency.

The control system 13 of the rescue terminal 1 comprises a communication unit 132 (not shown in FIG. 12 but explained in detail with reference to FIG. 13 below) being connected or connectable with an external communication network 9 such as a telephone network or the internet. Via the communication unit 132, the rescue terminal 1 communicates the detection of an emergency to recipients or entities inside or outside the building, e.g. to the fire department or a security agency. The communication of the communication unit 132 and the external communication network 9 may at least in sections be wireless. In the example shown in FIG. 12, the communication unit 132 communicates via radio waves 7 with another device not shown in the figure, being connected with the internet. The wireless communication may be effected via a wireless local area network (WLAN). Alternatively, of course also a wired connection of the communication unit 132 with the external communication network 9 is be possible.

With reference to FIG. 13 an embodiment of the control system 13 of the rescue terminal 1 will now be explained in more detail. FIG. 13 is a block diagram and schematically shows the various components of the control system 13. The control system 13 may particularly be used in the rescue system 4 according to FIG. 12.

In order to detect an acoustic signal 8 of the smoke detector 3, the communication unit 132 comprises a microphone 1322 connected with control electronics 137 in a suitable manner, e.g. with amplification and/or analog-to-digital conversion of an audio signal output by the microphone 1322. The communication system 132 further comprises a wireless communication interface 1320 connected with a suitable antenna and with the control electronics 137.

The control electronics 137 comprise an input/output system 1370 which receives audio signals from the microphone 1322 and controls the communication with the external communication network 9 via the wireless communication interface 1320. Furthermore, the control electronics 137 comprise a memory system 1372 for storing computer-readable information and a processor 1371 for processing computer-readable information. By means of the control electronics 137, the audio signals from the microphone 1322 are analyzed. When an acoustic signal 8 of one or more smoke detectors such as the smoke detector 3 of FIG. 12 is detected the control system 13 changes from a passive state into an active state. In the active state, sound and in particular speech is output by means of the microphone 130B in order to be perceived by the user 5. The speech to be output may e.g. be recorded speech, e.g. including user instructions or other information as described above, stored on the memory system 1372. Alternatively, the control system 13 may receive speech via the wireless communication interface 1320, e.g. from fire department and/or security agency personnel, generally referred to as rescue personnel.

In addition to the speech output, the light source 130A is made to produce a light, in particular a flash light. According to FIG. 13, the light source 130B comprises several light emitting diodes. By a change in the active state, also the wireless communication interface 1320 may be activated and used to establish a communication; alternatively, the wireless communication interface 1320 is permanently activated. As another alternative, the control system 13 may comprise a wired communication interface (e.g. a wired telephone or internet connection) instead of wireless communication interface 1320.

The control system further comprises a plurality of sensor units 131 which are adapted to sense the presence of poisonous components in the surrounding air and/or a temperature or other measurands. Each sensor unit 131 may be adapted to sense one specific component, such as carbon monoxide, or different components. The sensor units 131 may be activated when the control system 13 switches into its active state. The user 5 may then be informed of specific hazards, such as the presence of carbon monoxide above a predefined concentration. In order to inform the user 5, the control electronics 137 may analyze signals output by the sensor units 131 and operate the loudspeaker 130B and/or the sight source 130A accordingly. Furthermore, the control system may switch to the active state when a sensor unit 131 detects a poisonous component in surrounding air. Alternatively, the control system 13 may be provided with only one sensor unit 131 or may not be provided with any sensor unit.

A permanent power supply 135 supplies power to the control electronics 137 and the components connected therewith. The power supply 135 is connected with an external power source not shown in FIG. 13. For the case of a failure of the external power source, the power supply 135 is further connected with one or more batteries 136.

Figure 14:
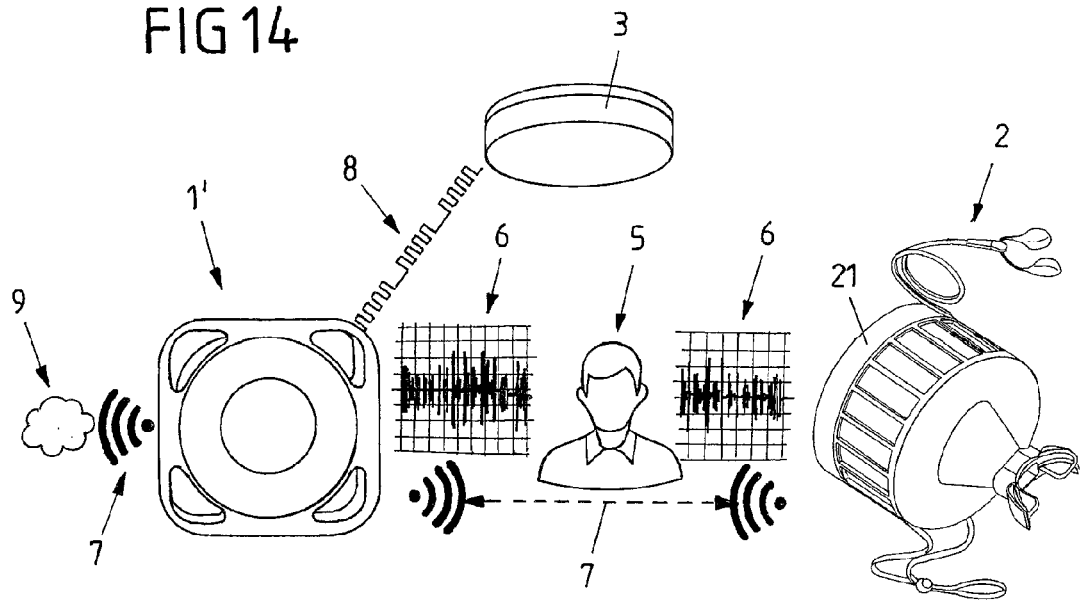
FIG. 14 shows another embodiment of a rescue system.

Turning now to FIG. 14, another embodiment of a rescue system 4' will be described. The rescue system 4' according to FIG. 14 is similar to the rescue system 4 according to FIG. 12, so that reference is made to the description above and in the following only the differences between the systems will be explained.

The rescue system 4' according to FIG. 14 comprises an air filter device 2 being equipped with a control system 21 which will be explained in greater detail with reference to FIG. 15 below. The rescue system 4' further comprises a rescue terminal 1' which differs from the rescue terminal 1 of the rescue system 4 according to FIG. 12 in that it is equipped with another embodiment of a control system 13'.

The control system 13' of the rescue terminal 1' and the control system 21 of the air filter device 2 of the rescue system 4' according to FIG. 14 are connectable with each other via radio wave 7, e.g. in the form of a wireless local area network (or a cellular network, or via an optical or an infrared communication). By means of such a connection, the control system 21 of the air filter device 2 may be connected with the external communication network 9 via the rescue terminal 1'. Therefore, the user 5 using the air filter device 2 may communicate with other persons inside or outside the building, in particular with rescue personnel. Furthermore, the control system 21 of the air filter device 2 may transmit or receive information regarding the emergency and/or the user 5 to said persons or personnel. The rescue terminal 1' serves as a central communication unit.

Figure 15:
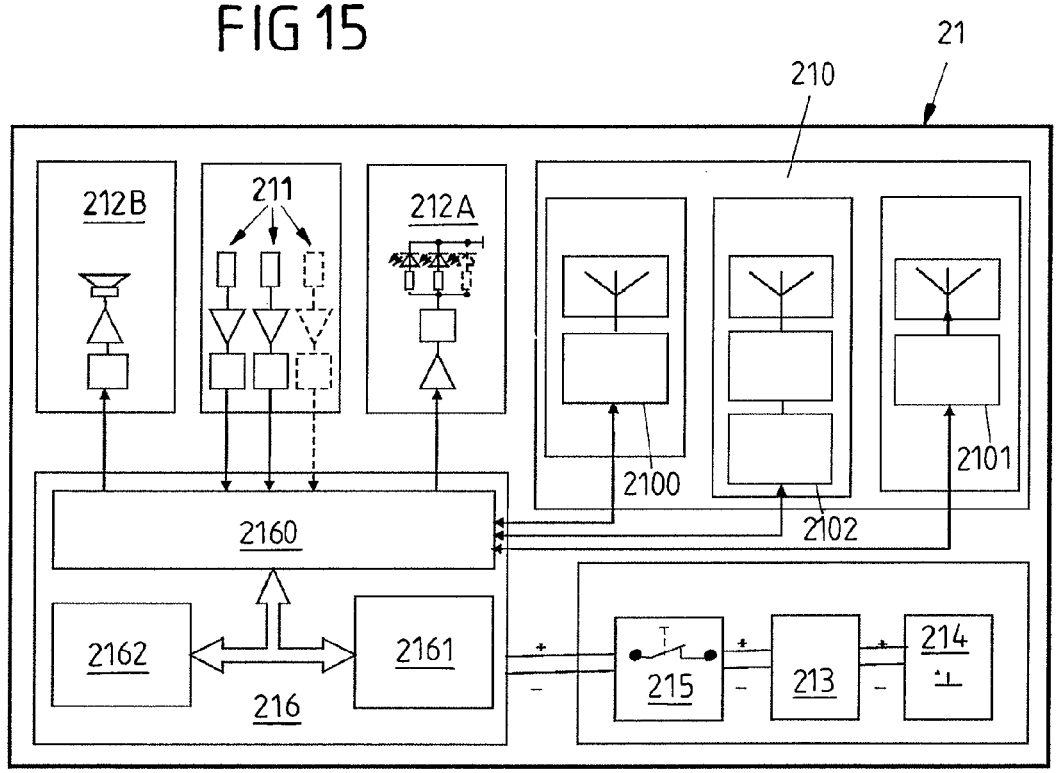
FIG. 15 shows a block diagram of a control system of an air filter device according to an embodiment.

FIG. 15 shows a schematic block diagram of the control system 21 of the air filter device 2. The control system 21 comprises a communication unit 210 having a wireless communication interface 2100 for wireless communication, e.g. with a rescue terminal such as the rescue terminal 1' of the rescue system 4' according to FIG. 14. The wireless communication may be established in the form of a wireless local area network. The communication unit 210 further comprises a positioning system 2102 having a receiver antenna for determination of the position of the air filter device 2. The positioning system 2102 may comprise a satellite positioning system such as GPS, GLONASS, Galileo, Beidou or the like or a positioning using radio signals received from wireless local area networks and/or cellular networks in the vicinity. The communication unit 210 furthermore comprises a radio tag 2101 emitting radio signals for detection by radio tag detectors. Rescue personnel may be assisted in finding the user 5 of the air filter device 2 by means of a radio tag detector which detects signals emitted by the radio tag 2101.

The control system 21 is also equipped with control electronics 216 having an input/output system 2160, a processor 2161 and a memory system 2162. For sending, receiving, storing and/or processing information, in particular computer-readable information. The control electronics 216 are connected with and/or control the wireless communication interface 2100, the positioning system 2102 and the radio tag 2101 of the communication unit 210. The control electronics 216 are further connected with signaling devices in the form of a loudspeaker 212B and a light source 212A, the latter comprising several light emitting diodes. Moreover, the control system 21 includes a plurality of sensor units 211. A sensor unit 211 may be adapted to sense one specific poisonous component, such as carbon monoxide, or one sensor unit 211 may be configured to sense the presence of different poisonous components. In addition or alternatively, the plurality of sensor units 211 may comprise sensor units 211 configured for measuring a breathing pressure, a breathing frequency, a blood pressure (e.g. by means of pressure sensors); it may comprise sensor units 211 configured for measuring a temperature of exhaled air, a body temperature of the user 5 and/or a temperature of surrounding air (e.g. by means of temperature sensors); a pulse or an oxygen saturation of blood of the user 5 (e.g. by means of optical sensors); a compass, a pedometer and/or configured for measuring other measurands. Sensor data may be communicated to rescue personnel in order to supervise the health status of the user 5. Alternatively, the control system 21 may be provided with only one sensor unit 211 or may not be provided with any sensor unit.

The light source 212A may provide light to the user 5. Alternatively or additionally it may serve to inform the user 5 that the air filter device 2 has been activated. As another alternative, or in addition, the light source 212A may be configured to assist rescue personnel to find the user 5. For the latter purpose, the light source 212A may emit a flashlight.

The control electronics 216 and the components connected therewith are supplied with power by a power supply 213 which receives electrical power from one or more batteries 214. In order to maintain the charge of the batteries 214 while the air filter device 2 is stored and not in use, a switch 215 disconnects the control electronics 216 (and with it the other components of the control system 21) from the power supply 213 as long as the air filter device 2 is not in use. The switch is operatively connected with the collapsible portion 22 or the mouth piece 23 of the air filter device 2 so that the switch is opened when the collapsible portion 22 is in its collapsed configuration and is closed when the collapsible portion 22 is in its extended configuration.

By means of the loudspeaker 212B information may be output, particularly in the form of speech output. These information may include, for example, a notification to the user 5 that an alarm has been raised and rescue personnel have been informed; information regarding hazards detected by analysis of sensor data (e.g. recorded by the sensor units 211) by the control electronics 216; a spoken navigation towards a safe location or an exit of the building and/or the same or similar speech output as output by the rescue terminal 1, 1'. The speech output may be played back from storage in the memory system 2162, it may be generated upon information received or sensed by the sensor units 211 or the communication unit 210, or it may be spoken by a person communicating through the air filter device 2 (e.g. by remote rescue personnel).

In addition to the components shown in FIG. 15, the control system 21 may further comprise a microphone by means of which the user 5 could communicate, e.g. with rescue personnel, via the wireless communication interface 2100.

Figure 16:
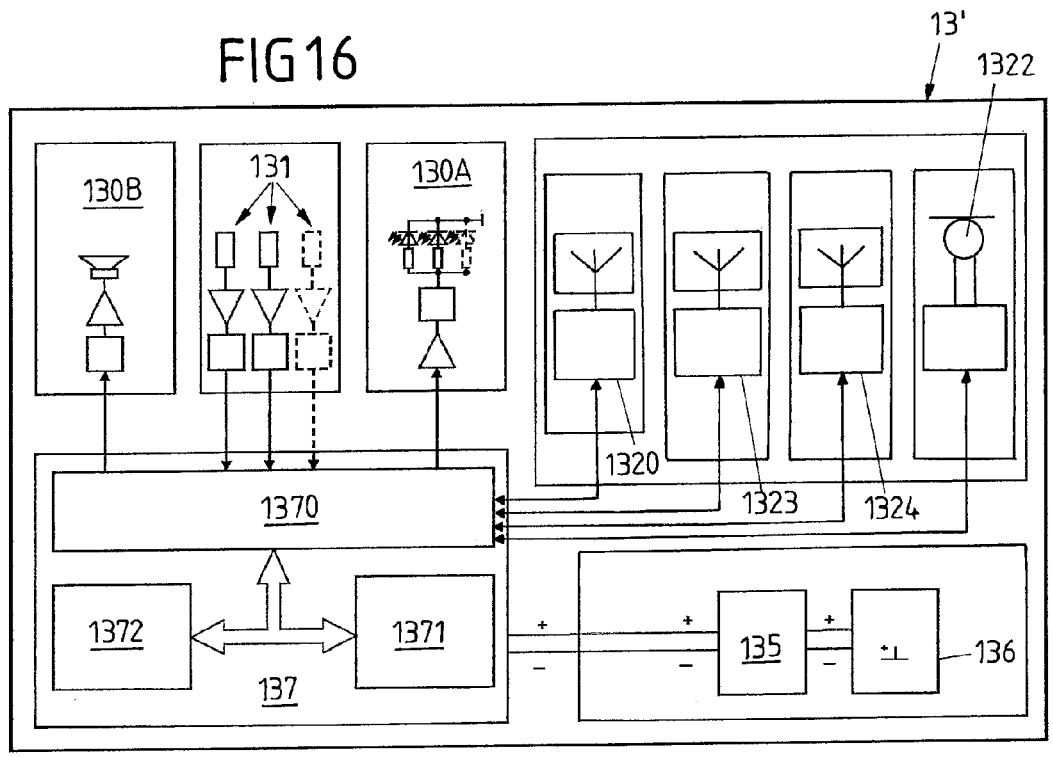
FIG. 16 shows a block diagram of a control system of a rescue terminal according to another embodiment.

FIG. 16 shows another embodiment of a control system 13' of a rescue terminal, such as e.g. the rescue terminal 1' of the rescue system 4' according to FIG. 14. In contrast to the control system 13 according to FIG. 13, the control system 13' of FIG. 16 has receivers 1323, 1324 for receiving information from a positioning system or the radio tag 2101 of the air filter device 2, in order to locate the air filter device 2. Otherwise the control system 13' corresponds to the control system 13 according to FIG. 13.

Figure 17:
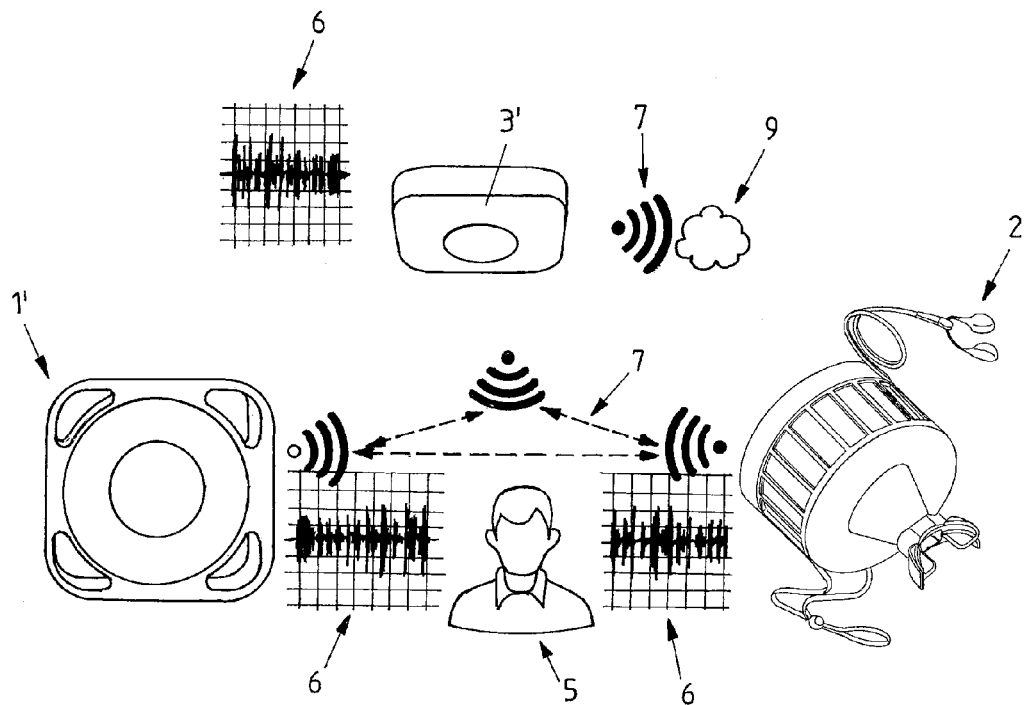
FIG. 17 shows another embodiment of a rescue system.

With reference now to FIG. 17 another embodiment of a rescue system 4" will be explained. In contrast to the embodiment of the rescue system 4' according to FIG. 14, the rescue system 4" according to FIG. 17 is equipped with a smoke detector 3' having a communication unit for wireless communication. Smoke detectors as the smoke detector 3' of the rescue system 4" are generally known as intelligent smoke detectors.

By means of its communication unit the smoke detector 3' is connected or connectable with an external communication network 9 such as the internet. A rescue terminal 1', and an air filter device 2 are connectable with each other and with the smoke detector 3' likewise by means of the wireless communication using radio waves 7 (in particular in the form of a wireless local area network). The rescue terminal 1' and the air filter device 2 correspond to the rescue terminal 1' and the air filter device 2 used in the rescue system 4' according to FIG. 14. However, in the rescue system 4" according to FIG. 17, the rescue terminal 1' and the air filter device 2 are connected or connectable with the external communication network 9 via the (intelligent) smoke detector 3'.

By means of its communication unit, the smoke detector 3' may be activated via the wireless communication, e.g. in the case of an emergency detected at a remote location or by an external emergency management. Conceivable are, e.g., emergencies where a chemical spill or a volcano eruption or another catastrophe has happened after which poisonous gases may be present. In all such cases, the emergency management could inform users 5 of rescue systems such as rescue system 4" of FIG. 17, provide information and/or advice, e.g. advise to use the air filter device 2.

On the other hand, the smoke detector 3' may send information to the external communication network 9 (in particular the internet). For example, the smoke detector 3' could provide sensor data to the user 5 of the rescue system 4" when not being in the building where the rescue system 4" is installed, allowing to remotely check (e.g. on a mobile device such as a smartphone, tablet computer or wearable computer device) whether or not an emergency is detected in said building or for checking sensor data. Alternatively or in addition, the smoke detector 3' may provide sensor data to an external computing system such as a cloud. The smoke detector 3' may comprise corresponding sensors, or it may receive sensor data from the rescue terminal 1' and/or the air filter device 2. Likewise, the smoke detector 3' may acquire position information of the air filter device 2 and provide this information to the external communication network 9, e.g. to rescue personnel. In addition, a floor plan of the building or a flat within the building may be provided as well.

The smoke detector 3' may be configured to output speech

The rescue system 4" may comprise a plurality of rescue terminals 1' and a plurality of air filter devices 2. Each rescue terminal 1' and/or air filter device 2 may have a unique identification number or another unique identifier. By means of the unique identification number or identifier it may be supervised how many and which air filter devices 2 have been activated. A master-slave priority may be assigned to the rescue terminals 1' and/or air filter devices 2, so that the user(s) of the master(s) (e.g. a parent) become(s) (automatically) informed whether or not the user(s) (e.g. children) of the slave(s) have activated their air filter devices 2. For example, at least one user of the master air filter device could receive a warning message when at least one slave air filter device has not yet been activated at a certain point of time (e.g. a given period of time after the detection of a case of an emergency).

Upon activation of the control system 21 of the air filter device 2, the communication unit 210 of the air filter device 2 may transmit a piece of information to the rescue terminal 1', to a communication unit 210 of another air filter device 2, to the smoke detector and/or to the external communication network 9. As an example, it could be supervised, e.g. via the external network 9, whether or not a certain air filter device 2 has been activated or not.

The plurality of air filter devices 2 may communicate with each other, e.g., by sending messages or by voice communication.

Of course each of the rescue systems 4, 4', 4" described herein could be equipped with more than one smoke detector 3, 3' and/or more than one rescue terminal 1, 1' and/or more than one air filter device 2, 2'.

Figure 18B:
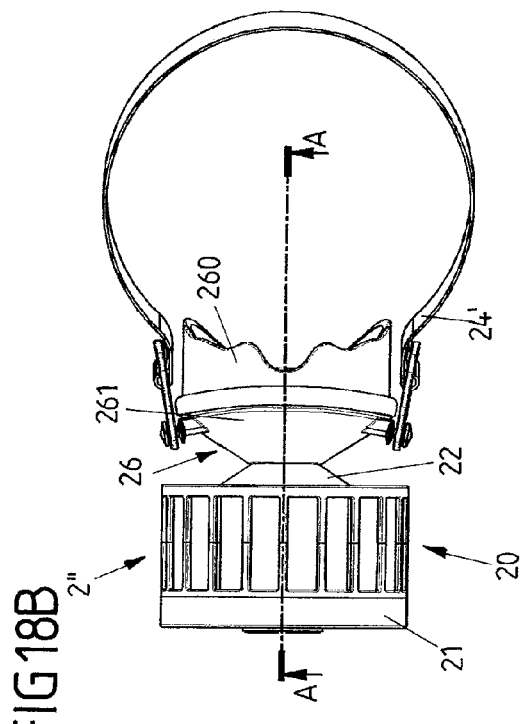
FIG. 18A to 18D show another embodiment of an air filter device.
Figure 18D:
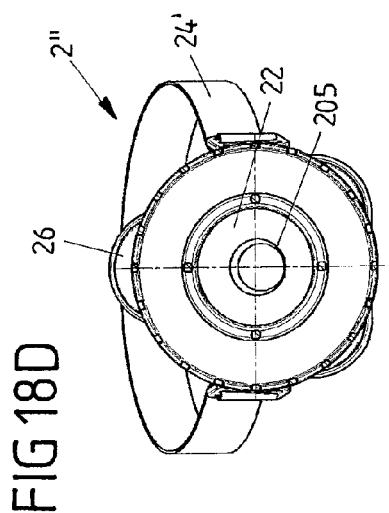
Figure 18A:
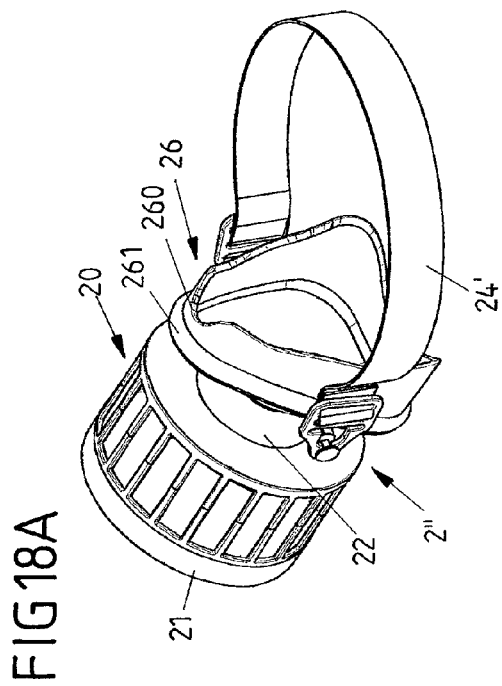
Figure 18C:
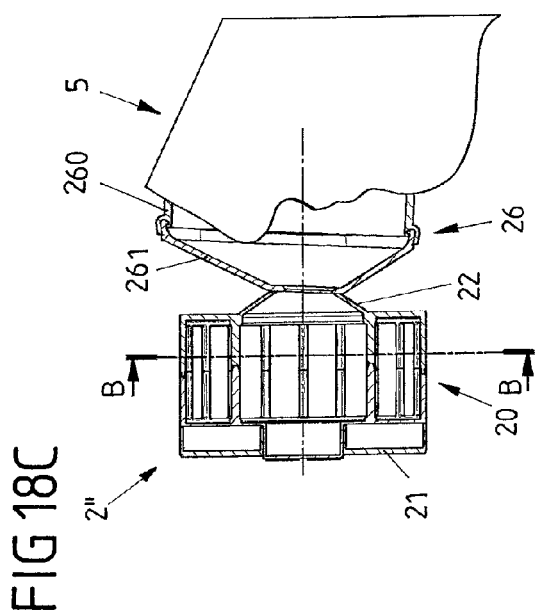

FIG. 18A to 18D show another embodiment of an air filter device 2". Therein, FIG. 18A shows a perspective view of the air filter device 2", FIG. 18B shows a top view, FIG. 18C shows a cross-sectional view through plane A-A shown in FIG. 18B, and FIG. 18D shows the air filter device 2" cut open through plane B-B shown in FIG. 18C.

The air filter device 2" according to FIG. 18A to 18D substantially corresponds to the air filter device 2 according to FIG. 8, wherein like reference signs indicate like components and it is referred to the above for their description.

In contrast to the air filter device 2 according to FIG. 8, the air filter device 2" according to FIG. 18A to 18D has no mouth piece but a mask 26 which is adapted and provided to commonly cover the mouth and nose of the user 5. The mask 26 comprises a substantially cone-shaped frontal part 261 and, attached thereto, a circumferential face seal 260. The face seal 260 is made of a flexible material such as rubber and serves for sealing the mask 26 against the skin of the user 5.

The air filter device 2" comprises an elastic band 24' instead of a neck band. The elastic band 24' serves for tightly applying the air filter device 2" to a user's 5 head. For this purpose, the elastic band 24" is adjustable to a size of the user's 5 head. It is further adapted to resiliently urge the mask 26 against the user's 5 head for a tight connection thereto.

What is claimed is:

1. A rescue terminal for providing access to an air filter in case of an emergency, comprising:
    a control system arranged at a main body of the rescue terminal, configured and provided to be activated upon a detection of a case of an emergency and having:
        at least one signaling device configured and provided to emit a signal upon activation of the control system; and
        a communication unit configured and provided for at least one of receiving and transmitting information indicative for a case of an emergency;
    a receiving housing of the main body being configured and provided for receiving a portable air filter device; and
    the air filter device accommodated in the receiving housing and provided for filtering air inhaled by a user, wherein the air filter device comprises a control system comprising a communication unit configured and provided to be connectable with a communication network via at least one of the rescue terminal, a communication unit of another air filter device and a smoke detector.

2. The rescue terminal of claim 1, wherein the communication unit comprises a wireless communication interface configured and provided for communicating via at least one of the following types of communication: radio, wireless local area network, cellular network, optical and infrared.

3. The rescue terminal of claim 1, wherein the communication unit comprises a wired communication interface configured and provided for communicating via a wired network.

4. The rescue terminal of claim 1, wherein the communication unit comprises a microphone for receiving an acoustic signal.

5. The rescue terminal of claim 4, wherein the control system is configured for identifying an acoustic signal of an external smoke detector received by the microphone.

6. The rescue terminal of claim 1, wherein the control system further comprises at least one sensor unit configured for detection of a case of an emergency by sensing a characteristic feature of a case of an emergency, wherein the characteristic feature sensed by the sensor unit is at least one of the group of: a presence of smoke, a density of smoke, a concentration of carbon monoxide, a concentration of carbon dioxide, a concentration of hydrogen cyanide and a temperature.

7. The rescue terminal of claim 1, wherein the signal emitted by the signaling device is at least one of an acoustic and an optical signal.

8. The rescue terminal of claim 7, wherein the signal emitted by the signaling device comprises an acoustic speech output containing at least one of information regarding the presence of an emergency, information regarding the rescue terminal location and directions for use of the rescue terminal.

9. The rescue terminal of claim 1, wherein the air filter device is accommodated in the receiving housing in an air-tight manner.

10. The rescue terminal of claim 1, wherein the receiving housing is adapted to be mounted on a wall of a building.

11. A rescue terminal for providing access to an air filter in case of an emergency, comprising:
    a control system arranged at a main body of the rescue terminal, configured and provided to detect of a case of an emergency and having:
        at least one sensor unit configured for detection of a case of an emergency by sensing a characteristic feature of a case of an emergency; and
        at least one signaling device configured and provided to emit a signal upon detection of a case of an emergency;
    a receiving housing of the main body being configured and provided for receiving a portable air filter device and to be mounted on a wall of a building; and
    the air filter device accommodated in the receiving housing and provided for filtering air inhaled by a user.

12. An air filter device, configured to be accommodated in an air-tight receiving housing of a rescue terminal according to claim 1 and having:
    a filter unit configured for filtering air flowing through the filter unit;
    a control system having an inactive state and an active state and comprising a communication unit configured and provided to be connectable with a communication network via the rescue terminal upon activation of the control system; and
    a collapsible portion being extendable from a collapsed configuration into an extended configuration, and wherein the control system is configured to be activated upon extension of the collapsible portion from the collapsed configuration into the extended configuration.

13. The air filter device of claim 12, wherein the communication unit of the control system is further configured to communicate with an external smoke detector.

14. The air filter device of claim 12, wherein the control system further comprises at least one sensor unit configured and provided for sensing at least one of the group of: a presence of smoke, a density of smoke, a concentration of carbon monoxide, a concentration of carbon dioxide, a concentration of hydrogen cyanide, a temperature and a health status of a user of the air filter.

15. The air filter device of claim 12, wherein the control system further comprises a positioning system.

16. The air filter device of claim 12, wherein the control system further comprises a signaling device configured and provided to emit a signal upon activation of the control system.

17. A rescue system for providing access to an air filter in case of an emergency, comprising:
    a smoke detector;
    at least one air filter device; and
    at least one rescue terminal according to claim 1.

18. The rescue system of claim 17, wherein the smoke detector comprises a communication unit and the communication unit of the control system of the rescue terminal is configured for receiving information indicative for a case of an emergency from the communication unit of the smoke detector.

19. The rescue system of claim 17, wherein the smoke detector comprises at least one sensor unit configured for detection of a case of an emergency by sensing a characteristic feature of a case of an emergency, wherein the characteristic feature sensed by the sensor unit is at least one of the group of: a presence of smoke, a density of smoke, a concentration of carbon monoxide, a concentration of carbon dioxide, a concentration of hydrogen cyanide and a temperature.

20. The rescue system of claim 17, wherein the air filter device comprises a control system comprising a communication unit configured and provided to be connectable with a communication network via at least one of the rescue terminal, a communication unit of another air filter device and the smoke detector.

21. The rescue system of claim 20, wherein, when the control system of the air filter device assumes the active state, the communication unit of the air filter device is configured and provided to send a piece of information to at least one of the rescue terminal, a communication unit of another air filter device and the smoke detector.

22. The rescue system of claim 20, wherein the communication unit of the rescue terminal, the communication unit of the smoke detector and the communication unit of the air filter device are connectable with each other via at least one of the following types of communication: radio, wireless local area network, cellular network, optical and infrared.

* * * * *